United States Patent Office 3,677,938
Patented July 18, 1972

3,677,938
CHROMATOGRAPHIC SEPARATION WITH
POROUS SILICA
Madeleine A. Le Page, Paris, and Albert J. de Vries, Chevilly-la-Rue, France, assignors to Produits Chimiques Pechiney-Saint-Gobain, Chateau Neuilly-sur-Seine, France
No Drawing. Continuation-in-part of application Ser. No. 616,463, Feb. 16, 1967. This application Mar. 18, 1970, Ser. No. 20,849
Claims priority, application France, Feb. 24, 1966, 50,950
Int. Cl. B01d 15/08
U.S. Cl. 210—31                         13 Claims

ABSTRACT OF THE DISCLOSURE

This invention is addressed to the chromatographic separation process using columns filled with porous silica particles in which the porous silica particles are formed by calcination of silica gel at temperatures within the range of 400–1000° C. with the silica gel containing foreign atoms such as alkali metal cations and acidic anions such as sulfur, etc.

---

This is a continuation-in-part of applicants' copending application, Ser. No. 616,463, filed Feb. 16, 1967, now abandoned.

This invention relates to chromatographic separation with columns filled with porous silica grains.

The technique of separation of different chemical compounds from a fluid mixture by chromatography consists in channeling the liquid through capillary tubes or columns filled with various granular substances having a fixed phase. Depending upon the differences in chemical affinity with the fixed phase, the chemical compounds are differentially retarded during their passage through the column to enable separation which permits identification and collection of the separated compounds at different outlets or from the same outlet of the column at different times.

It is possible with a chromatographic column filled with different porous substances, having poorly defined porosity and texture, and while using a fixed phase in the form of a liquid, to effect separation of numerous chemical compounds having high molecular masses. By way of example, mention can be made of the separation of hexane from propane in admixture with a hydrogen current circulated through a column of diatomaceous earth having silicone oil added as the stationary or fixed phase.

Attempts have been made to extend the separation process to different molecules embodied in a fluid mixture, often containing very complex molecules of masses having important current use, such as in polymer chemistry, and in biological chemistry by the retarding phenomenon based upon the blocking of molecules of a predetermined dimension present in the mixture on porous substances having pore dimensions adapted for the particular molecular system.

Given that the size and shape of the complex molecules to be separated are highly diverse, it will be obvious that it will be necessary to make use of porous filling substances having a wide range of porous characteristics which are carefully selected to provide good selectivity in the particular system.

Several types of microporous filling or packing substances have been proposed, such as particles formed of special porous glasses or organic macromolecules, reticulated and swollen by solvents. These different types of filling substances have a number of disadvantages due generally to the difficulties in providing them with the various ranges of porosities for optimum selectivity, or other difficulty in determining in advance the porosity needed, particularly with reticulated molecules or the textural evolutions resulting from the increase in temperature, or other chemical incompatibilities existing between the filling substance and the products to be separated or the solvent carriers.

In accordance with the present invention, it has been found that these various deficiencies can be minimized or avoided in chromatographic separation by working with a filling substance formed of calcined silica gel particles which are characterized by high mechanical strength and integrity, a well defined porosity, and high thermal and chemical stability. Calcined silica gel grains having great mechanical strength, defined porosity and good chemical and thermal stability can be prepared by the process described in the Le Page et al. Pat. 3,493,341, granted Feb. 3, 1970, in which the silica gel grains contain between 1–10% by weight of alkali metal cations, expressed as $M_2O$ and have been calcined at a temperature within the range of 400–1000° C., and preferably 600–800° C.

Most preferred for use in the present invention are silica gel grains prepared in accordance with the method prepared in the copending Le Page et al. applications, Ser. No. 610,786, filed Jan. 23, 1967 and Ser. No. 20,850 filed Mar. 18, 1970, wherein description is made of silica gel grains containing between .01–10% of an alkali metal cation selected from the group consisting of lithium, sodium, potassium and cesium, and an acidic anion in an amount within the range of 0.1–6% by weight. The most pre-silica gels described in these copending applications are those in which the alkali metal cation is present in an amount in excess of the amount which would be stoichiometrically combined with the anion component present. The anion component is preferably present in an amount which would be required to react in stoichiometric proportions with or neutralize between 10–90% of the cation component present in the case of the acidic anions of sulfate, particularly the sulfate and bromide, chloride and iodide. While the upper limit of 90% described above may be applied where the anion component is phosphorus in the form of the phosphate acid anion, it is possible that the phosphate ion may be present in an amount corresponding to 100% of the amount which would be combined with the cation component.

Silica gel grains as described above may be calcined at a temperature within the range of 400–1000° C., and preferably within the range of 600–800° C. to provide filler material having exceptionally well defined porosities.

In addition to having a wide range of porosity which can be varied by varying the calcination temperature, silica gel particles prepared by the methods described above have a high degree of mechanical strength, chemical stability and thermal stability. The first is due, in part, to the low reactivity of the silica which is substantially entirely dehydrated; the second results, in part, from the calcination treatment which leads to dehydration whereby the ultimate use is at a sensibly lower temperature than calcination temperatures and therefore does not result in noticeable amounts of textural change.

Having described the basic concepts of the invention, reference is now made to the following specific examples which are provided by way of illustration, but not by way of limitation of the practice of the invention.

EXAMPLE 1

This example illustrates the results secured in the efficiency of fractionation of different samples of polystyrene having molecular weights ranging from 12,500 to 875,000 in chromatographic columns filled with microglobules of calcined silica gel containing alkali metal cations and acidic anions. Comparison will be made with the results obtained in the separation by means of reticulated polymer grains of the type usually employed for this purpose in the present industrial practice.

Separate batches of silica gel microglobules having diameters within the range of 40 to 100μ are calcined at temperatures of 600, 700, 750 and 800° C. respectively. The range of porosity of each of the four calcined materials was determined with a mercury porosimeter. A couple formed of stainless steel tubes or columns, having a length of 200 cm. and a diameter of 0.8 cm. were filled by squeezing in the calcined grains. The columns of chromatographic fractions obtained were maintained at 60° C. for several hours and then the columns were filled with tetrahydrofurane.

Five groups of molecules of differently polymerized polystyrene were prepared by ionic polymerization and identified as group $a$ having a molecular weight of 12,500; group $b$ having a molecular weight of 35,000; group $c$ having a molecular weight of 90,000; group $d$ having a molecular weight of 267,000, and group $e$ having a molecular weight of 875,000, and measured by luminous diffusion.

Mixtures were made of equal parts of $a+b$, $b+c$, $c+d$ and $d+e$. Each of the four mixtures were dissolved in tetrahydrofurane to form a 0.5% by weight solution.

Separation of the molecular groups in each of the mixtures was carried out by passing 1 ml. of solution into the top of the first column of each couple filled with a given batch of porous silica globules. Both of the columns of each couple are then simultaneously eluted with a constant withdrawal of 0.8 ml. per minute of tetrahydrofurane and the differences in the refraction indexes between the effluents of both columns was continuously noted. For each couple, corresponding to each mixture $a–b$, $b–c$, $c–d$ and $d–e$ of polystyrene molecules, a curve is obtained which shows two peaks corresponding to the maximal percentage of the eluent of the first column of the couple in each of the two groups of molecules present in the mixture introduced into the columns.

The volume of eluent issuing from the first column of each couple within a period of time ranging from the time of introduction to the time when the two peaks occur represents the volumes of retention of each of the molecular groups of the mixture being tested. For example, with the mixture $a–b$, a first volume of retention $VR_a$ is obtained and a second volume of retention $VR_b$ is obtained from which the selectivity of the filling material for the mixture can be calculated by the equation:

$$S_{a-b} = \frac{VR_a - VR_b}{VR_a}$$

For all of the separations, different values $S_{a-b}$, $S_{b-c}$, $S_{c-d}$, $S_{d-e}$, are obtained for each type of filling material. The following table sets forth the different values secured for these selectivities and for the same selectivities for the separation carried out on the industrial filling material of reticulated polystyrene of the type usually employed for such separation.

TABLE I

| Fillings of silica on microglobules of 40 to 100μ | Selectivity | | | |
|---|---|---|---|---|
| | $S_{a-b}$ | $S_{b-c}$ | $S_{c-d}$ | $S_{d-e}$ |
| Calcination temperature, 600° C. <br> Total porous volume, 1 cm.³/g <br> Porous repartition: <br> 80% <60 A. <br> 100% <150 A. | 0.20 | 0.07 | 0.005 | 0 |
| Calcination temperature, 700° C. <br> Total porous volume, 0.92 cm.³/g <br> Porous repartition: <br> 20% <85 A. <br> 40% <88 A. <br> 60% <95 A. <br> 80% <115 A. <br> 100% <300 A. | 0.12 | 0.11 | 0.125 | 0 |
| Calcination temperature, 750° C. <br> Total porous volume, 0.87 cm.³/g <br> Porous repartition: <br> 20% <260 A. <br> 40% <280 A. <br> 60% <290 A. <br> 80% <315 A. <br> 100% <1000 A. | 0.11 | 0.10 | 0.17 | 0.07 |
| Calcination temperature, 800° C. <br> Total porous volume, 0.83 cm.³/g <br> Porous repartition: <br> 20% <460 A. <br> 40% <475 A. <br> 60% <485 A. <br> 80% <540 A. <br> 100% <1500 A. | 0.05 | 0.06 | 0.075 | 0.20 |
| Filling of reticulated polystyrene grains | <0.05 | <0.05 | <0.09 | <0.13 |

It will be evident from the table that each of the carriers has a maximal selectivity for a particular molecular size and that these values are far above the values secured for the reticulated polystyrene carrier.

EXAMPLE 2

This example illustrates the separation of a polyvinyl chloride into a series of fractions of decreasing molecular weight. The polyvinyl chloride polymer used is prepared by the bulk polymerization of vinyl chloride, and is commercially available under the trade name "Lucovyl."

A stainless steel column having a length of 200 cm. and an internal diameter of 5 cm. is fitted with porous metal plugs at both ends, and is packed with 1950 g. of spherical silica beads. The silica beads used are prepared in accordance with the methods described in Ser. No. 20,850 and comprise a mixture of five equal parts by weight of silica beads calcined at 600°, 650°, 700°, 750° and 800° C. respectively, each of which have been sieved to contain only particles having diameters within the range of 100 and 150 microns. The pore size distribution is determined by means of a mercury intrusion porosimeter as shown in the following table:

TABLE II

Total porous volume=0.84 cc./gram

Percentage of porous volume with

| pore radii smaller than: | Percent |
|---|---|
| 100 A. | 10 |
| 200 A. | 25 |
| 500 A. | 60 |
| 750 A. | 80 |
| 2000 A. | 90 |
| 5000 A. | 100 |

After the column is packed, tetrahydrofuran solvent is pumped slowly upwardly through the column for about 2 hours to completely replace air occluded in the voids of the porous volume.

A solution of the polymer (5 g. of polymer dissolved in 10 ml. of tetrahydrofuran solvent) is then introduced at the top of the column and eluted downwardly with pure solvent by means of a plunger pump operating at a constant flow rate. The column is maintained at 30° C.

The liquid effluent from the bottom of the column is separated into several fractions at regular intervals of time, and the polymer content of each fraction is determined by weighing after evaporation of the solvent. The average molecular weight of each polymer fraction is determined by the conventional light scattering method, and the results are shown in the following table:

TABLE III

| Elution volume (ml.) | Polymer content (mg.) | Average molecular wt. |
|---|---|---|
| 0–1,650 | 0 | |
| 1,650–1,800 | 236 | 380,000 |
| 1,800–1,950 | 490 | 220,000 |
| 1,950–2,100 | 760 | 134,000 |
| 2,100–2,250 | 1,175 | 86,000 |
| 2,250–2,400 | 940 | 51,000 |
| 2,400–2,550 | 724 | 32,400 |
| 2,550–2,700 | 462 | 18,500 |
| 2,700–2,850 | 226 | 9,500 |
| 2,850–3,000 | 0 | |
| 3,000–3,150 | 0 | |
| Total | 5,013 | |

As shown from the total of the polymer contents of each fraction, the total amount of the polymer introduced to the column is recovered within the limits of experimental error.

As is also shown in Table III, the average molecular weight of the polymer in each fraction decreases regularly with the increasing elution volume. This indicates that the average residence time in the column is greater for smaller molecules (polymers having lower molecular weights) due to the fact that the accessible fraction of the porous volume of the silica beads is greater for smaller molecules.

This example illustrates that the concepts of the present invention enable a separation to be made of a sample of commercially dispersed polymer containing a mixture of macromolecules of widely differing sizes which can be efficiently and rapidly separated into fractions of various average molecular weights. Each fraction which is separated contains macromolecules whose molecular weights are only slightly greater than and slightly less than the average molecular weight. The efficient separation of the original polymeric mixture into a large number of fractions from an original mixture including macromolecules of a very broad range of molecular weights is made possible by the use of silicas of the present invention which provide a broad range of pore size in the silica particles. The same results cannot be obtained by the use of silicas heretofore available which contain only a narrow range of pore sizes.

EXAMPLE 3

This example illustrates the separation of polypropylene polymers, which are soluble only at relatively high temperatures, into a series of fractions of decreasing molecular weights.

The polypropylene polymers used in this example are commercially available polymers which are sold under the trade name "Napryl."

In this example, the column and the mixture of silica particles used are the same as those used in Example 2. After the column is packed with the mixture of silica beads, a solvent which is not susceptible to thermal degradation at temperatures sufficiently high to render the polymer soluble, in this case 1,2,4-trichlorobenzene, is pumped into the column at a temperature of 135° C. There after, the column is put into an oven maintained at 135° C. and a sample of the polymer solution containing 5 g. of polypropylene in 100 ml. of solvent is introduced to the top of the column.

The elution of the polymer and its separation into a series of fractions is carried out in the same manner as described in Example 2 except that the temperature of the column in this example is maintained at a temperature of 135° C. during the entire operation in order to prevent precipitation of the polymer in the column.

The molecular weight of the polymer fractions is determined by intrinsic viscosity measurements, and the results are shown in the following table:

TABLE IV

| Elution volume (ml.) | Polymer content of fraction (mg.) | Viscosity, average molecular weight |
|---|---|---|
| 0–1,650 | 0 | |
| 1,650–1,800 | 248 | 1,200,000 |
| 1,800–1,950 | 420 | 515,000 |
| 1,950–2,100 | 784 | 310,000 |
| 2,100–2,250 | 862 | 206,000 |
| 2,250–2,400 | 746 | 133,000 |
| 2,400–2,550 | 584 | 82,000 |
| 2,550–2,700 | 463 | 51,000 |
| 2,700–2,850 | 345 | 35,000 |
| 2,850–3,000 | 282 | 20,500 |
| 3,000–3,150 | 194 | 12,000 |
| 3,150–3,300 | 0 | |
| Total | 4,928 | |

As indicated by the above table, the total amount of polymer recovered in the fractions corresponds to the quantity of polymer introduced to the top of the column within the limits of experimental error, thereby indicating that no precipitation or adsorption of the polymer has occurred in the column.

This example demonstrates that a column filled with silicas of the present invention can be used in a continuous manner for the separation of macromolecules at temperatures of up to 150° C. without any measurable change in the texture of properties of the silica packing due to the excellent chemical and thermal stability of the silica packing.

EXAMPLE 4

This example illustrate the use of a column packed with porous silica beads containing alkali metal cations and acidic anions for fractionation of a complex mixture of water-soluble polymers and other molecules of the type found in biological fluids. In this example, the fluid to be separated is a horse blood serum.

The column used in this example is a glass column having an internal diameter of 2.5 cm. and a length of 100 cm., and is packed with spherical silica beads having diameters within the range of 100–150 microns and which has been calcined at 600° C. The pore size distribution for the silica beads is the same as that shown in the table in Example 1 (i.e., 80% of the porous volume of the silica gel beads is composed of pores having a radius smaller than 60 A.).

The solvent pumped into the column after packing is completed is a .1 molar aqueous buffer solution having a pH of 7.5. 10 ml. of a sample of horse blood serum are introduced to the top of the column and elution is begun at a flow rate of 25 ml. per minute. The effluent from the bottom of the column is analyzed in a continuous manner by means of a differential refractometer and a U.V. absorption detector.

The chromatogram recorded by means of the differential refractometer, shows the presence of three different groups of components, each of which are characterized by a well defined peak. The U.V. absorption detector operating at a wave length of 280 millimicrons, indicates the presence of the components defining only the first two peaks, and was not able to detect the components defining the third peak.

Analysis of the U.V. absorption spectrum and of the nitrogen content of the components of the first two peaks indicates that they are composed of proteins. The elution volume of the first peak (203 ml.) is identical to the void volume of the column. The fraction corresponding to this peak contains various protein molecules, mostly globulins whose sizes are larger than the pore sizes in the silica beads; therefore, these molecules are completely excluded from the porous volume.

The elution of the second peak (325 ml.) is identical to the elution volume measured under the same conditions of a solution of a sample of pure horse serum albumin. The third fraction having elution volume of 422 ml., corresponding to the total volume of liquid in the column, contains only low molecular weight materials, including carbohydrates and inorganic electrolytes.

This example illustrates that the porous silica beads of the present invention are useful not only in the separation of chain-like synthetic macromolecules soluble in organic solvent but also in the separation of molecules having a complex structure of the type found in biological fluids.

Since it is possible, using the silica particles of the present invention containing alkali metal cations and acidic anions, to substantially precisely determine the porosity of the silica particles before separation, it becomes possible to make use of filling materials which are formulated of mixtures of porous silica grains to present different repartitions of porosities, particularly in the case of the separation of complex molecular mixtures.

It is also possible to make use of granular particles having a size other than microglobules. For example, it is often advantageous to make use of a granulometry within a very narrow range to increase the efficiency of the chromatographic separation per unit length of column. Finally, it is possible to make similar use of glassy gel grains of silica produced by crushing silica gel masses formulated to contain the specified amounts and types of foreign atoms, and in which calcination has produced the desired porosity characteristics.

It will be understood that changes may be made in the details of formulation and method of operation without departing from the spirit of the invention, especially as defined in the following claims.

We claim:

1. In the method of separation of organic molecules by chromatography, the improvement comprising the steps of filling a chromatographic column with calcined porous silica particles containing 1–10% by weight of alkali metal cations, the particles having been calcined at a temperature within the range of 400 to 1200° C. and then introducing the molecules in a fluid carrier to the column.

2. A method as defined in claim 1 wherein the silica particles also contain an acid anion selected from the group consisting of sulfate, phosphate, bromide, chloride and iodide anions.

3. A method as defined in claim 2 wherein said cation is selected from the group consisting of lithium, sodium, potassium and cesium cations.

4. A method as defined in claim 2 wherein said anion is present in an amount within the range of 0.1–6% by weight.

5. A method as defined in claim 2 wherein the cation is present in an amount in excess of the amount which would be stoichiometrically combined with the anion.

6. A method as defined in claim 2 wherein the anion is present in an amount corresponding to the amount which would be stoichiometrically combined with between 10–90% of the cation present in the silica particles.

7. A method as defined in claim 2 wherein the anion is a phosphate anion and is present in an amount up to the amount which would be stoichiometrically combined with the cation present in the silica particles.

8. A method as defined in claim 1 in which the porous silica particlen have a grain size within a narrow range.

9. A method as defined in claim 1 in which the porous silica particles comprise a mixture of porous silica particles having pore dimensions within different ranges.

10. A method as defined in claim 1 in which the fluid carrier is a liquid in which the molecules are present in the dissolved state.

11. A method as defined in claim 1 wherein the porous silica particles comprise a mixture of silica particles which have been calcined at different temperatures.

12. A method as defined in claim 11 wherein the mixture of silica particles has been calcined at different temperatures within the range of 600–800° C.

13. In the method of separation of organic molecules by chromatography, the improvement comprising the steps of filling a chromatographic column with calcined porous silica particles containing 1–10% by weight of alkali metal cations and 0.1–6% by weight of an anion selected from the group consisting of sulfate, phosphate, bromide, chloride and iodide anions, with the cation being present in an amount in excess of the amount which would be stoichiometrically combined with the anion, said particles having been calcined at a temperature within the range of 400 to 1200° C., and then introducing the molecules in a fluid carrier to the column.

References Cited

UNITED STATES PATENTS

| | | | |
|---|---|---|---|
| 3,549,524 | 12/1970 | Haller | 210—198 X |
| 3,546,256 | 12/1970 | Zimmerman | 210—31 X |
| 3,493,341 | 2/1970 | Le Page et al. | 252—451 |
| 2,462,564 | 2/1949 | Skeen | 260—96 |
| 2,161,186 | 6/1939 | Morgan et al. | 252—451 |
| 2,097,634 | 11/1937 | Malan et al. | 23—182 |

J. L. DeCESARE, Primary Examiner